United States Patent [19]
Llop

[11] 3,739,630
[45] June 19, 1973

[54] MICRODUROMETER WITH AUTOMATIC CALCULATION

[75] Inventor: Helenio Llop, Montreuil, France

[73] Assignee: Creusot-Loire, Paris, France

[22] Filed: Mar. 3, 1972

[21] Appl. No.: 231,490

[30] Foreign Application Priority Data
Mar. 5, 1971 France .............................. 7107616
Sept. 28, 1971 France .............................. 7134874

[52] U.S. Cl. .................................................. 73/81
[51] Int. Cl. .............................................. G01n 3/42
[58] Field of Search ........................................ 73/81

[56] References Cited
UNITED STATES PATENTS
3,559,466  2/1971  Calleson .................................. 73/81

Primary Examiner—Richard C. Queisser
Assistant Examiner—Arthur E. Korkosz
Attorney—William B. Kerkam, Jr.

[57] ABSTRACT

A microdurometer for measuring the hardness of a sample by the production of an impression therein by means of a pyramidal diamond with four faces which is applied to the sample under a predetermined force P, the hardness being proportional to $P/d^2$ where $d$ is the length of the diagonal of the impression, the microdurometer including means for applying the diamond to the sample, means for linearly displacing a sighting grid between the ends of an impression made in a sample, a first voltage generator coupled to the grid displacing means producing a voltage inversely proportional to the square of the displacement of the grid, a second voltage generator for producing a voltage proportional to the force of application of the diamond and connected to the first voltage generator to produce an analogue product of the two voltages proportional to the hardness of a sample and a voltmeter calibrated in units of hardness to indicate the product.

11 Claims, 13 Drawing Figures

MICRODUROMETER WITH AUTOMATIC CALCULATION

The present invention relates to improvements in microdurometers.

Measurement of the hardness of a sample is at present performed on apparatus called a microdurometer, by producing an impression in the sample under test by means of a four-faced pyramidal diamond applied to the sample under a predetermined load P. By means of a micrometric measuring device the length of the diagonal of the impression is then measured. Depending on the shape of the diamond used to make the impression, the hardness H is expressed either on the Vickers scale by the formula $H = 1854.4 P/d^2$ or on the Knoop scale by the formula $H = 14229 P/d^2$, in these two formulae the load P is expressed in grammes and the length $d$ of the diagonal of the impression is expressed in microns.

Usual hardnesses allow of separate measurement of the load of application of the diamond to the sample, P, and the length $d$ of the diagonal of the impression. The hardness is then determined by the use of tables, generally supplied with the apparatus and giving the value of the hardness as a function of the variables P and $d$.

In apparatus of this type the cycle of production of the impression on the sample is already usually made automatic, which eliminates the human factor in the mechanical performance of the impression. On the other hand the determination of the true applied load and above all the measurement of the length of the diagonal are measurements which leave room for an interpretation of the reading which can lead to slightly different results of measurement, depending on the operator.

In accordance with the present invention there is provided a microdurometer for measuring the hardness of a sample by the production of an impression therein by means of a pyramidal impress diamond with four faces applied to the sample under a force P, in which the measurement of the hardness H is determined by a formula of the form $H = KP/d^2$, $d$ being the length of the diagonal of the impression and K a constant coefficient, the microdurometer comprising a slide carrying an impress diamond, operating means for the slide for applying the diamond to a sample with an adjustable force, optical means for observing the impression, means for linearly displacing a sighting grid, a first voltage generator coupled to the displacing means for providing an output signal inversely proportional to the square of the linear displacement of the grid and provided with means for reducing the output signal to zero, a second voltage generator for providing an output signal proportional to the force of application of the diamond, the two generators being connected to provide an analogue product of their output signals, and a voltmeter for indicating the product of the two signals.

According to one embodiment of the invention, applicable to a microdurometer in which the displacement of the grid is controlled by a disc of which the angular rotation is proportional to the linear displacement of the grid, the first generator includes a "$a=1/x^2$"— law potentiometer, driven by the disc at a constant ratio of rotation, and an amplifier for amplifying the output voltage of the potentiometer.

According to another embodiment of the invention, utilising ordinary linear-law electrical components to provide greater exactness the higher the value of $x$, the first generator includes two linear potentiometers driven simultaneously at a constant ratio of rotation by the disc controlling the displacement of the grid, each potentiometer being connected to the input of an operational amplifier, the two potentiometer-amplifier combinations being connected in series.

According to another embodiment of the invention, to enable measurement of a diagonal of an impression of which the dimensions exceed those which correspond to the normal travel of the disc controlling the displacement of the grid, an additional resistor is interposed between each potentiometer and the associated amplifier, the terminals of each of these two resistors being connected to a short-circuiting switch, the two switches being in turn coupled to a common operating device.

In another embodiment to obviate the need for manual setting of the potentiometer or potentiometers of the first generator to zero the first generator includes a movable member coupled to the disc and displaceable in a housing, the housing being provided with means for adjusting its position relative to the frame of the microdurometer, the position of the movable member relative to the housing, corresponding with zero output voltage, being determined by a stop.

Further features and advantages of the present invention will become apparent from the following description of embodiments thereof, given by way of example only, with reference to the accompanying drawings.

In the drawings:

FIG. 1 is a schematic representation of an apparatus for hardness measurement, provided with a built-in device for optical observation of the impression.

FIG. 2 diagrammatically shows part of the microdurometer for automatic hardness measurement, FIG. 3 diagrammatically shows an embodiment of the two generators of FIG. 2, FIG. 4 diagrammatically shows another embodiment of the two generators of FIG. 2, FIG. 8 shows the projection of the impression in the plane of the sighting grid and the corresponding positions of the disc, for measurement of an impression of which the length exceeds the normal travel of the disc, where 8a represents a grid position used for reference, 8b represents a left side grid position measurement, and 8c represents a right side grid position measurement, FIG. 9 diagrammatically shows a modification of the parts shown in FIG. 7, and FIG. 10 diagrammatically shows means for automatic reset to zero of the first generator of FIGS. 7 or 9.

Referring to FIG. 1, the microdurometer comprises a slide 1 guided in its movement by members here represented schematically by rollers 2. The slide 1 carries at one end a pyramidal diamond 3. The application of the diamond 3 to the sample 4 is obtained in accordance with an automatic cycle by the rotation of a cam 6 against which bears a lever 7 pivoted at a fixed point 8. The lever bears at a knife-edge 9 against a beam 10 loaded at one end with a weight 11, and bearing at its other end against a knife-edge 12 on the slide 1. It can be seen that when the cam 6 has lifted the lever 7 sufficiently to bring the diamond 3 into contact with the sample 4, the force of penetration of the diamond 3 results from the weight of the known mass 11, possibly multiplied by a coefficient resulting from the ratio of the leverage of the arms of the beam 10.

When the slide and the diamond have returned to the position of rest shown in the figure, the impression made by the diamond on the sample 4 can be observed through a conventional lens-system 15 by means of eyepiece 16 and mirror 17. The impression is illuminated by a luminous source 18 via a semi-reflecting mirror 19.

The length of the diagonal of the impression is measured by measurement of its image in the object plane of the eyepiece 16 by parallel displacement of an engraved grid 20 by rotation of an engraved circular scale 21 of which the angular rotation is proportional to the linear displacement of the grid 20.

In known microdurometers the length of the diagonal is measured by optically aligning the grid with each end of the image of the impression, the measurement resulting from the reading of the corresponding rotation on the circular scale. The applied load resulting from the mass 11 loading the end of the beam 10 is known.

Referring now to FIG. 2, in an embodiment of a microdurometer in accordance with the invention, the circular scale 21 controlling the displacement of the grid 20 is coupled by a positive transmission mechanism 22 to a rotary potentiometer 24.

The potentiometer 24 is an "$a=1/x^2$"—law potentiometer, that is, its output voltage varies as the inverse square of its angular displacement.

The potentiometer 24 is fed at stabilized voltage by a generator 25, and the output voltage at the cursor 24 of the potentiometer is amplified by the amplifier 27.

The potentiometer 24 and a voltage generator 30 are connected in series to provide analogue product of their output voltages with the result that the output voltage from the generator 30 represents the product of the voltages produced in each of the generator and potentiometer.

This output voltage is amplified in an amplifier 31 and fed to a digital voltmeter 32.

It can be seen that if, when the grid is aligned with one of the ends of the impression on the sample 4, the potentiometer 24 is brought to zero output voltage by turning its housing 26 by means of a knob 34, the output voltage at the cursor 24 at the time of the second alignment of the grid with the other end of the diagonal of the impression will be proportional to $1/d^2$, $d$ being the length of the diagonal of the impression. The generator 30 is a linear generator, the voltage produced being proportional to the load 11. It can be seen that under these conditions the voltage at the output of the amplifier 31 is both proportional to the load and inversely proportional to the square of the length of the diagonal of the impression. The voltage measured by the voltmeter 32 will thus be, except for a constant coefficient, the measure of the hardness of the sample 4, and the voltmeter can be graduated directly in a scale of hardness. In practice the voltmeter is of dual sensitivity selected by means of a changeover switch 35, and corresponding with two hardness scales, Vickers and Knoop. The voltmeter 32 is followed by a print-out recorder 36.

FIG. 3 shows one form of the measurement circuit which has been described above. Here the source of stabilized voltage 25 is simply constituted by a battery, and the generator 30 is made of four strain gauges connected together in a Wheatstone bridge. The group of gauges is glued to a rod by which a pan carrying the weight 11 hangs from the beam 10.

FIG. 4 shows another form of the generator 30. Here a generator 30 simply consists of a step-potentiometer fed by the output voltage from the amplifier 27. Each step corresponds with one of the weights in the series used for loading the beam 10, in such a way that the voltage drop in the potentiometer is proportional to the weight corresponding with the reference number of the contact stud.

Figure 5:
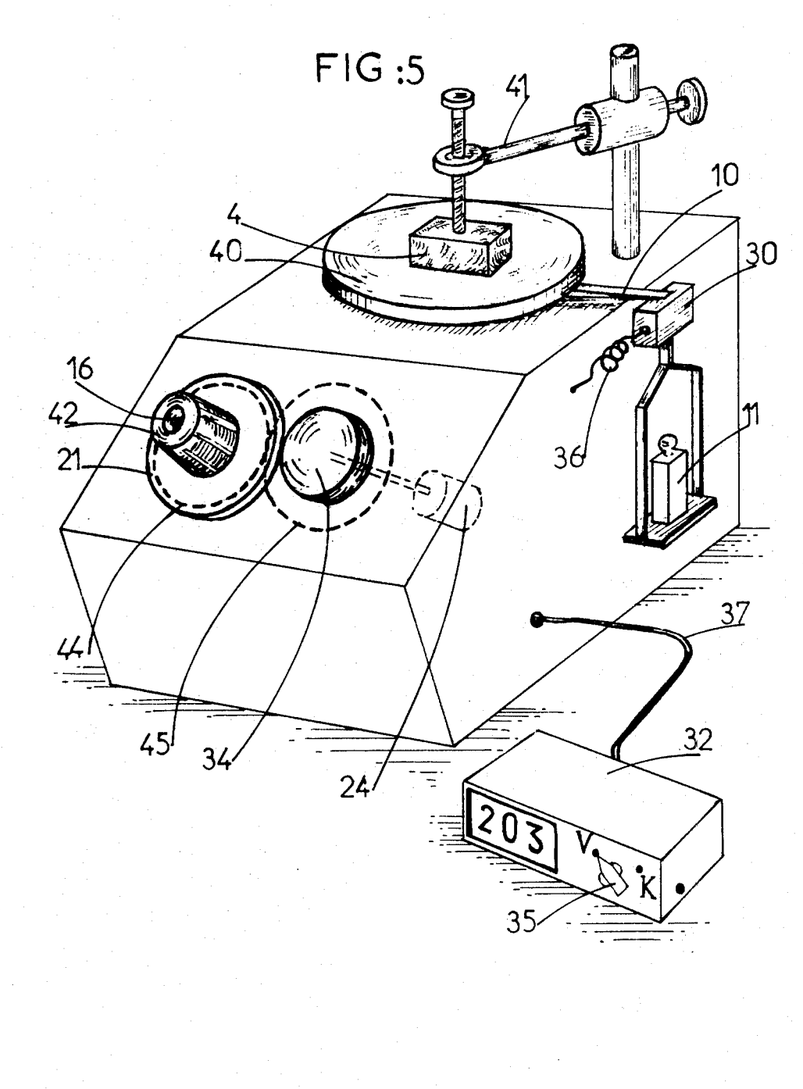
FIG. 5 is a general perspective view of the microdurometer, FIG. 6 diagrammatically shows another embodiment of the parts of the microdurometer shown in FIG. 2, FIG. 7 diagrammatically shows in more detail the parts shown in FIG. 6.

Referring now to FIG. 5 which represents in a simplified manner the external appearance of an embodiment of a microdurometer in accordance with the invention, the known members of a microdurometer of a conventional type will be recognised. Thus the sample 4 of which it is desired to measure the hardness is held onto the table 40 by a clamp 41. The eyepiece 16 is incorporated in a knurled knob 42 which controls the rotation of the graduated circular scale 21 and at the same time the linear displacement of the sighting grid. Inside the apparatus a pair of gears 44 and 45 transmit the rotational movement of the circular scale to the potentiometer 24. As previously stated, the knob 34 allows rotation of the housing of the potentiometer 24 for resetting the output voltage and hence the reading on the voltmeter 32 to zero at the time of first aligning the grid with one end of the diagonal of the impression made on the sample 4.

The apparatus is here equipped with the strain gauge type of generator 30 which is inserted between the beam 10 and the pan carrying the applied load 11. The electrical connection from the generator 30 to the other apparatus of the measurement equipment is effected by the cable 36. The final measurement signal is transmitted to the digital voltmeter 32 through the cable 37.

When using the above described apparatus the changeover switch 35 is first switched to the position corresponding to the nature of the diamond with which the slide has been equipped. Then an impression is made on the sample. The grid is next brought into alignment with one of the ends of the impression and the reading of the voltmeter 32 is brought to zero by means of the knob 34. Next when the grid is brought into alignment with the other end of the diagonal of the impression, the value of the hardness of the sample is automatically displayed on the voltmeter, without having to make any calculations.

If the apparatus is equipped with a step-potentiometer as the generator 30, it is necessary before aligning the grid with the impression, to set the potentiometer on the step corresponding to the load 11 put on the pan.

Referring to FIG. 6, there is shown another embodiment of the measurement circuit. It will be observed that the graduated circular scale 21, mechanically coupled in other respects to the means for displacing the grid, is also mechanically coupled to the cursors of two linear potentiometers 10 and 51. Each linear potentiometer 50 and 51 is connected respectively to the input of two operational amplifiers 52 and 53. The two potentiometer-amplifier groups 50 – 52 and 51 – 53 are connected in series.

Figure 7:
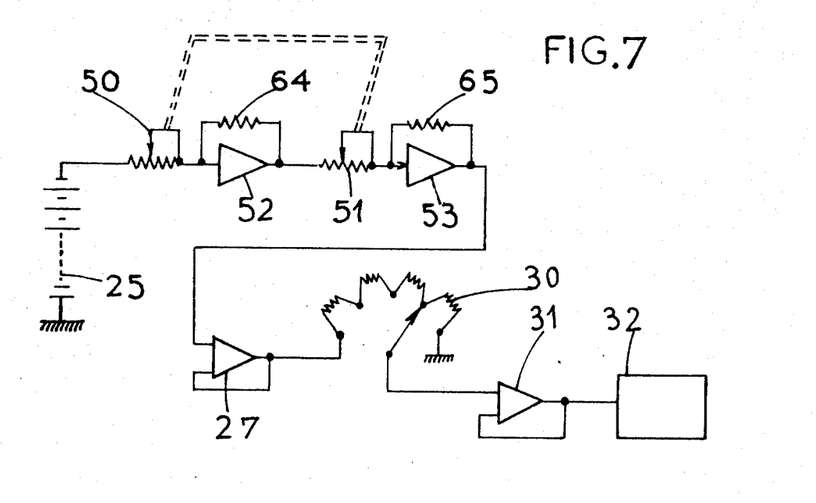

The diagram of FIG. 7 shows in more detail reverse feedback resistors 64 and 65 of each amplifier 52 and 53. The two amplifiers, their two reverse feedback resistances and the two potentiometers have respectively the same characteristics. If the value of the reverse feedback resistor 64 or 65 is designated by R and the value of the resistance of the potentiometer 50 or 51 by $r$, it can be seen that the gain $g$ of each amplifying stage is equal to $R/r$. Now $r$ is proportional to the deviation $x$ of the graduated circular scale, that is to say, to the displacement $d$ of the grid. Consequently the gain $g$ of each stage is equal to $R/Ad$ and the overall gain $G$ of the two stages in series is equal to $R^2/A^2d^2$, which can also be written $G = K/d^2$ since $R$ and $A$ are constants. The input voltage $U_e$ provided by the source 25 being fixed, the voltage $U_s$ at the output from the amplifier 53 will be equal to $U_e K/d^2$. Thus it will be sufficient to adjust the gains of each amplifier 52, 53, 27 and 31 to obtain the law $H = KP/d^2$ allowing direct measurement of the hardness.

Referring now to FIG. 9 there is shown yet another embodiment of the measuring circuit. It will be seen that the circuit differs from that of FIG. 7 by the addition of fixed resistors 59 and 60 and switches 61, 62. Resistor 59 is interposed in series between the potentiometer 50 and amplifier 52, and its value is equal to the maximum resistance of the potentiometer 50. Similarly the resistor 60 between the potentiometer 51 and the amplifier 53 has a value equal to the maximum resistance of the potentiometer 51. Each of the two resistances 59 and 60 can be short-circuited respectively by the switches 61 and 62, which are mechanically coupled.

In the case of the circuit of FIG. 7, or in the case of the circuit of FIG. 9 with the switches 61 and 62 closed, the maximum measurable length of the impression diagonal corresponds to a rotation slightly less than one turn of the circular scale 21, that is to say, to the maximum travel of the potentiometers 50 and 51. Let us assume that the maximum travel of the circular scale corresponds to a displacement of the grid by 100 microns. We know that in this case the measurement of the diagonal of the impression is made by sighting the grid on one end of the diagonal and bringing a pointer opposite the zero of the graduation of the circular scale, then making another sighting of the grid on the other end of the diagonal.

In the case where the dimension of the diagonal exceeds 100 microns, the refinement of FIG. 9 allows its measurement to be made, by employing a grid with two engraved lines 55 and 56 (FIG. 8), the distance between the two lines being exactly 100 microns, and the positive sense of the measurements corresponding with the sense of displacement of 56 towards 55. The measurement operation is then performed in three phases shown by the three parts 8a, 8b and 8c of FIG. 8. Considering these three phases in terms of the manual operation of the apparatus, in the first phase the righthand line 55 of the grid is centred approximately in the middle of the impression, and the pointer is adjusted to zero on the circular scale (FIG. 8a). In the second phase (FIG. 8b) the lefthand line 56 of the grid is sighted on the lefthand end of the impression and the reading $d_1$ is taken from the circular scale. This reading is more than 50 microns since the impression is assumed to measure more than 100 microns. In the third phase (FIG. 8c) the righthand line 55 of the grid is finally sighted on the righthand end of the diagonal, and the corresponding reading $d_2$ is observed, which is also larger than 50 microns. The dimension $d$ of the diagonal of the impression expressed in microns will then be $d = 100 + d_2 - d_1$.

Thus it can be seen that in relation to direct measurement of the impression, a constant of 100 microns has been added to $d$, corresponding with the distance between the two grid lines 55, 56. It is the constant resistances 59 and 60 which correspond to the increase by the 100 micron constant, since each of these resistances is equal to the maximum value of resistance of the potentiometers 50 and 51, and these potentiometers allow coverage of a range of 100 microns.

It may be observed that the function thus effected by the circuit from the input to the potentiometer 50 up to the output from the amplifier 53 is: output voltage $U_s = U_e K/(100+d^2)$.

FIG. 10 shows an arrangement of part of the circuit of FIGS. 7 or 9 whereby manual resetting of the potentiometers 50, 51 to zero is avoided. The two potentiometers 50 – 51 are enclosed in a common housing 26 provided with a flange 70. The housing is mounted in the frame of the microdurometer in an entirely conventional manner so that it is free to rotate relative to the frame. For this reason, and in order to simplify the drawing, the free mounting of the housing in the frame is not shown. The housing 26 can be fixed relative to the frame or released by adjustment of stop-screw 71 threaded into a part 72 of the frame with its end 73 able to bear against the flange 70 to fix it against rotation.

Otherwise the shaft 22, integral with the movable parts of the potentiometers, is coupled to the flange 70 by a spiral spring 75 fixed at 76 to the shaft 22 and at 77 to the flange. The shaft 22 also has a cross spur 78 while the flange 70 bears a stop 79. The action of the spiral spring tends to bring the spur and the stop into contact, and the whole has been adjusted so that this stopped position corresponds with the electrical zero position of the potentiometers.

With such an arrangement the operation of hardness measurement can be performed in a simpler and more exact manner. The flange 70 being fixed by the screw 71, one proceeds in a normal manner to sight the grid on one of the ends of the impression. This entails a rotation of the circular scale 21, of the internal movable parts of the potentiometers and the spur 78. Without interrupting the sighting it is then sufficient to release the screw 71, which frees the flange 70 and the potentiometer housing; the spring 75 then automatically brings the stop 79 on the housing into contact with the spur 78, thus setting the resistance of the potentiometers to zero. The operator, still without having left the sighting, clamps the flange 70 and the housing in this zero position, then proceeds to sight the grid on the other end of the impression, the display on the voltmeter then corresponding with the hardness measurement.

Of course the invention is not intended to be limited to the embodiment which has been described but covers all the variants which originate from it.

It may be observed, for example, that the device for resetting the potentiometers 50, 51 to zero after the first sighting, described with reference to the apparatus with the two linear potentiometers, would be applicable in the same manner to the apparatus with a non-linear potentiometer. The recall spring 75 could be omitted, the movement of the housing towards the stop position being effected manually; the result is thus attained with almost as much advantage, the stop allowing the housing and the movable member to be brought into the zero starting position without having to perform a visual check at the voltmeter. Likewise the circuit could be energised with alternating current which would allow exemption from continuous drift in the d.c. amplifiers. The source 25 would then be a pilot oscillator of constant frequency and amplitude; the remainder of the electronic circuit would be practically unchanged, but the voltmeter would obviously be an alternating voltmeter.

What we claim is:

1. A microdurometer for measuring the hardness of a sample by the production of an impression therein by means of a pyramidal impress diamond with four faces applied to the sample under a force P, in which the measurement of the hardness H is determined by a formula of the form $H = KP/d^2$, $d$ being the length of the diagonal of the impression and K a constant coefficient, the microdurometer comprising a slide carrying an impress diamond, operating means for the slide for applying the diamond to a sample with an adjustable force, optical means for observing the impression, means for linearly displacing a sighting grid observable through said optical means, a first voltage generator coupled to the displacing means, means independent of said displacing means for setting the output signal of said first generator to zero for use as a reference when said sighting grid is at a first location, whereby the first generator provides an output signal in response to displacement of the sighting grid to a second location, a second voltage generator for providing an output signal proportional to the force of application of the diamond, the two generators being connected to provide an analogue product of their output signals, and a voltmeter for indicating the product of the two signals.

2. A microdurometer as in claim 1, in which the displacement of the grid is controlled by a rotatable disc whose angular rotation is proportional to the linear displacement of the grid, and the first generator includes an "$a = 1/x^2$"—law potentiometer, driven by the disc at a constant ratio of rotation, and an amplifier for amplifying the output voltage of the potentiometer.

3. A microdurometer as in claim 1, wherein the second generator comprises strain gauge means connected in a Wheatstone bridge which is connected to be energised by the output signal from the first generator and mounted on a member transmitting the applied force, and an amplifier for amplifying the output voltage from the Wheatstone bridge.

4. A microdurometer as in claim 1, in which the operating means include a pan which can be loaded with a series of stepped weights for varying the force of application of the diamond and the second generator includes a step-potentiometer, each step corresponding to one of the stepped weights, the stepping of the resistances in the potentiometer being inversely proportional to the stepping of the weights.

5. A microdurometer as in claim 1 wherein the first generator is a non-linear potentiometer and the means for reducing the output signal from the first generator to zero includes a device for rotational adjustment of the housing of the non-linear potentiometer.

6. A microdurometer as in claim 1, in which the displacement of the impression sighting grid is controlled by a rotatable disc whose angular rotation is proportional to the linear displacement of the grid and the first generator is adapted to provide an output signal inversely proportional to the square of the linear displacement of the grid and includes two linear potentiometers driven simultaneously at a constant ratio of rotation by the disc, each potentiometer being connected to the input of an operational amplifier, the two potentiometer-amplifier combinations being connected in series.

7. A microdurometer as in claim 6, in which an additional fixed resistor is interposed between each potentiometer and the associated amplifier, each of the two resistors being connected across a short-circuiting switch, the two switches being coupled to a common operating means.

8. A microdurometer as in claim 7, wherein each additional fixed resistor has a value equal to the maximum value of the resistance of the corresponding potentiometer.

9. A microduromater as in claim 1, in which the displacement of the grid is controlled by a rotatable disc whose angular rotation is proportional to the linear displacement of the grid and the first voltage generator comprises a movable member coupled to the disc and displaceable in a housing, the housing being provided with means for adjusting its position relative to the frame of the microdurometer, the origin position of the movable member relative to the housing being determined by a stop.

10. A microdurometer as in claim 9, wherein the means for adjusting the housing relative to the frame comprises a releasable locking device.

11. A microdurometer as in claim 10, wherein the movable element and the housing are coupled by an elastic recall device tending to bring them to their relative origin position.

* * * * *